US012697851B2

(12) United States Patent
Lee et al.

(10) Patent No.: US 12,697,851 B2
(45) Date of Patent: Aug. 4, 2026

(54) INTEGRATED THERMAL MANAGEMENT MODULE FOR VEHICLE

(71) Applicants: Hyundai Motor Company, Seoul (KR); Kia Corporation, Seoul (KR); Hyundai WIA Corporation, Changwon-si (KR)

(72) Inventors: Sang Shin Lee, Suwon-si (KR); Man Ju Oh, Yongin-si (KR); Ki Mok Kim, Busan (KR); Se Min Lee, Uiwang-si (KR); Bong Jun Park, Uiwang-si (KR); Man Hee Kim, Seoul (KR)

(73) Assignees: Hyundai Motor Company, Seoul (KR); Kia Corporation, Seoul (KR); Hyundai WIA Corporation, Changwon-si (KR)

( * ) Notice: Subject to any disclaimer, the term of this patent is extended or adjusted under 35 U.S.C. 154(b) by 407 days.

(21) Appl. No.: 17/969,970

(22) Filed: Oct. 20, 2022

(65) Prior Publication Data

US 2023/0141796 A1 May 11, 2023

(30) Foreign Application Priority Data

Nov. 11, 2021 (KR) ........................ 10-2021-0154690

(51) Int. Cl.
*B60H 1/00* (2006.01)
*B60H 1/32* (2006.01)

(52) U.S. Cl.
CPC ....... *B60H 1/00342* (2013.01); *B60H 1/3229* (2013.01); *B60H 2001/3291* (2013.01)

(58) Field of Classification Search
CPC .............. B60H 1/00342; B60H 1/3229; B60H 2001/3291
See application file for complete search history.

(56) References Cited

U.S. PATENT DOCUMENTS 5,394,710 A * 3/1995 Matsuo ................... F25B 40/02
165/113
5,813,249 A * 9/1998 Matsuo ................ B60H 1/3229
62/509

(Continued)

FOREIGN PATENT DOCUMENTS

CN 116045555 A * 5/2023 .............. F25B 43/00
DE 102020119813 B4 * 6/2025 ......... B60H 1/00278

(Continued)

*Primary Examiner* — Ljiljana V. Ciric
(74) *Attorney, Agent, or Firm* — Slater Matsil, LLP

(57) ABSTRACT

An integrated thermal management module for a vehicle includes a gas-liquid separator having an internal space configured to accommodate a refrigerant discharged from an evaporator, the gas-liquid separator being configured to supply to a compressor a portion of the refrigerant discharged from the evaporator that is in a gas state in the internal space, a refrigerant heat exchanger provided on a refrigerant inlet side of the gas-liquid separator, the refrigerant heat exchanger being configured to exchange heat of the refrigerant discharged from the evaporator with heat of the refrigerant having a flow path between a condenser and an expansion valve before the refrigerant discharged from the evaporator is introduced into the internal space of the gas-liquid separator.

20 Claims, 7 Drawing Sheets

(56)  References Cited

U.S. PATENT DOCUMENTS

| | | | | |
|---|---|---|---|---|
| 6,751,983 B1 * | 6/2004 | Dienhart | ................. | F25B 40/00 |
| | | | | 165/184 |
| 8,733,125 B2 | 5/2014 | Heckt et al. | | |
| 11,453,267 B2 * | 9/2022 | Koberstein | ........ | B60H 1/00907 |
| 11,975,593 B2 * | 5/2024 | Cao | .......................... | B60H 1/08 |
| 12,097,746 B2 * | 9/2024 | Lee | .................... | B60H 1/32284 |
| 2002/0078702 A1 * | 6/2002 | Makizono | ................. | F28D 7/04 |
| | | | | 62/271 |
| 2007/0261433 A1 * | 11/2007 | Mikita | .................... | F25B 40/00 |
| | | | | 62/503 |
| 2011/0113808 A1 * | 5/2011 | Ko | .......................... | F25B 30/02 |
| | | | | 62/324.3 |
| 2013/0145789 A1 * | 6/2013 | Kim | ........................ | F28D 9/005 |
| | | | | 62/506 |
| 2019/0039440 A1 * | 2/2019 | Calderone | ............ | B60K 7/0007 |
| 2021/0086587 A1 * | 3/2021 | Koberstein | .............. | B60H 1/22 |
| 2023/0141796 A1 * | 5/2023 | Lee | .................... | B60H 1/00342 |
| | | | | 62/113 |
| 2024/0286458 A1 * | 8/2024 | Kaufhold | .............. | F25B 43/006 |
| 2024/0408935 A1 * | 12/2024 | Lee | ...................... | B60H 1/3227 |

FOREIGN PATENT DOCUMENTS

| | | | | | |
|---|---|---|---|---|---|
| JP | 2002206823 | A | 7/2002 | | |
| KR | 101300556 | B1 | 9/2013 | | |
| KR | 101510121 | B1 | 4/2015 | | |
| KR | 102125025 | B1 * | 6/2020 | ............ | F25B 43/006 |
| WO | 2006065186 | A1 | 6/2006 | | |
| WO | WO-2009151830 | A1 * | 12/2009 | .............. | F24F 3/153 |
| WO | WO-2019026242 | A1 * | 2/2019 | ............ | F28F 9/0263 |

* cited by examiner

300

310  312

INTEGRATED THERMAL MANAGEMENT MODULE FOR VEHICLE

CROSS-REFERENCE TO RELATED APPLICATIONS

This application claims the benefit of Korean Patent Application No. 10-2021-0154690, filed on Nov. 11, 2021, which application is hereby incorporated herein by reference.

TECHNICAL FIELD

The present invention relates to an integrated thermal management module for a vehicle.

BACKGROUND

Recently, due to environmental issues of an internal combustion engine vehicle, the dissemination of an eco-friendly vehicle such as an electric vehicle is increasing. In a conventional internal combustion engine vehicle, additional energy for heating is not required since an inside of a vehicle can be heated by using waste heat of an engine. However, in the eco-friendly vehicle such as an electric vehicle and so on, since there is no heat source such as an engine, additional energy is required to perform heating.

Therefore, fuel efficiency of the eco-friendly vehicle is decreased and a drivable distance of the electric vehicle is reduced, and this causes inconveniences such as a need for frequent charging and so on.

Therefore, in an air conditioning apparatus of the eco-friendly vehicle such as the electric vehicle, a heat pump system that is different from a heat pump system of an air conditioning apparatus of the internal combustion engine vehicle has been applied.

Generally, a heat pump system is a cooling and heating apparatus that transfers heat from a low-temperature heat source to a high-temperature space or transfers heat from a high-temperature heat source to a low-temperature space by using generated heat or condensation heat of a refrigerant. Further, the heat pump system is configured to absorb heat of the outside and to release the absorbed heat to an inside of a vehicle when a heating operation is performed, and is configured to release heat of the inside of the vehicle to the outside when a cooling operation is performed.

However, in the eco-friendly vehicle such as the electric vehicle, it is necessary to manage heat of electric components such as a battery, a motor, and so on in addition to the air conditioning apparatus.

That is, in an inner space, the battery, and the electric components that are applied in the eco-friendly vehicle such as the electric vehicle, a technology capable of fulfilling functions of each component and capable of utilizing energy as efficiently as possible is required. Therefore, in order to improve thermal efficiency by integrating thermal management of the entire vehicle while independently performing thermal management for each configuration, an integrated thermal management concept has been proposed.

In order to perform the integrated thermal management of the vehicle, it is necessary to integrate and modularize coolant lines, refrigerant lines, and components that are complexly structured. Therefore, a concept of modularization in which multiple components are modularized and are easy to manufacture and are compact in terms of packaging is required.

The foregoing is intended merely to aid in the understanding of the background of the present invention, and is not intended to mean that the present invention falls within the purview of the related art that is already known to those skilled in the art.

SUMMARY

The present invention relates to an integrated thermal management module for a vehicle. Particular embodiments relate to an integrated thermal management module for a vehicle in which a production cost is reduced by modularizing the components related to a refrigerant of the vehicle on the basis of a gas-liquid separator such that multiple components are compactified and the multiple components are enabled to be assembled in a package module state during manufacturing/assembly process.

Accordingly, embodiments of the present invention keep in mind problems occurring in the related art, and an embodiment of the present invention provides an integrated thermal management module for a vehicle in which a production cost is reduced by modularizing the components related to a refrigerant of the vehicle on the basis of a gas-liquid separator such that multiple components are compactified and the multiple components are enabled to be assembled in a package module state during a manufacturing/assembly process.

There is provided an integrated thermal management module for a vehicle including a gas-liquid separator having an internal space in which a first refrigerant that is introduced from an evaporator is accommodated, the gas-liquid separator being configured to supply a refrigerant in a gas state in the refrigerant in the internal space to a compressor, and a refrigerant heat exchanger provided on a refrigerant inlet side of the gas-liquid separator, the refrigerant heat exchanger being configured to exchange heat of the first refrigerant which is discharged from the evaporator and which is positioned before being introduced into the internal space of the gas-liquid separator with heat of a second refrigerant that flows between a condenser and an expansion valve.

According to the integrated thermal management module for the vehicle of embodiments of the present invention, the refrigerant heat exchanger may be modularized with the gas-liquid separator by being formed integrally with the gas-liquid separator or by being assembled to the gas-liquid separator.

According to the integrated thermal management module for the vehicle of embodiments of the present invention, the integrated thermal management module for the vehicle may further include the expansion valve provided on the refrigerant heat exchanger and configured such that the expansion valve is connected to the refrigerant heat exchanger in a direction in which the second refrigerant is discharged.

According to the integrated thermal management module for the vehicle of embodiments of the present invention, the expansion valve may be modularized with the gas-liquid separator by being formed integrally with the gas-liquid separator or by being assembled to the gas-liquid separator.

According to the integrated thermal management module for the vehicle of embodiments of the present invention, the internal space of the gas-liquid separator may be formed in a shape in which an open portion is formed on an upper end portion of the gas-liquid separator and a bending point of a hemispherical shape is formed on a lower end portion of the gas-liquid separator.

According to the integrated thermal management module for the vehicle of embodiments of the present invention, the gas-liquid separator may further include a cover covering the open portion of the internal space, and the refrigerant heat exchanger may be provided on the cover of the gas-liquid separator.

According to the integrated thermal management module for the vehicle of embodiments of the present invention, the refrigerant heat exchanger may include a first channel through which the first refrigerant is discharged to the internal space of the gas-liquid separator, a second channel through which the second refrigerant is discharged to the expansion valve, and a partition wall provided between the first channel and the second channel to separate both the first channel and the second channel from each other.

According to the integrated thermal management module for the vehicle of embodiments of the present invention, a cross-sectional area of the channels may be formed in a circular shape, and the first channel and the second channel may be separated from each other by the partition wall formed across a center of a circle of the circular shape.

According to the integrated thermal management module for the vehicle of embodiments of the present invention, a lower side of the circle separated by the partition wall may protrude to the internal space of the gas-liquid separator, and an upper side of the circle may protrude outside the gas-liquid separator.

According to the integrated thermal management module for the vehicle of embodiments of the present invention, each of the first channel and the second channel may be formed in a spiral shape.

According to the integrated thermal management module for the vehicle of embodiments of the present invention, the first refrigerant and the second refrigerant may flow along the spiral shape of corresponding channels, and may flow in opposite directions.

According to the integrated thermal management module for the vehicle of embodiments of the present invention, a first inlet portion of the first channel may be disposed on a border portion of the spiral shape, a first discharge portion of the first channel may be disposed on a center portion of the spiral shape, a second inlet portion of the second channel may be disposed on the center portion of the spiral shape, and a second discharge portion of the second channel may be disposed on the border portion of the spiral shape.

According to the integrated thermal management module for the vehicle of embodiments of the present invention, the production cost is reduced by modularizing the components related to the refrigerant of the vehicle on the basis of the gas-liquid separator such that the multiple components are compactified and the multiple components are enabled to be assembled in a package module state during a manufacturing/assembly process.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Throughout the present specification, when a part is referred to as "including" an element, it means that the part may include other elements as well without excluding the other elements unless specifically stated otherwise.

In addition, terms such as first and/or second may be used to describe various elements, but the elements should not be limited by the terms. The above terms are only for the purpose of distinguishing one component from other components, and a first component may be referred to as a second component, and similarly a second component may also be referred to as a first component, for example, without departing from the scope of claims according to the concept of the present invention.

Hereinafter, a configuration and a working principle of various embodiments of the disclosed present invention will be described in detail with reference to the accompanying drawings.

Figure 1:
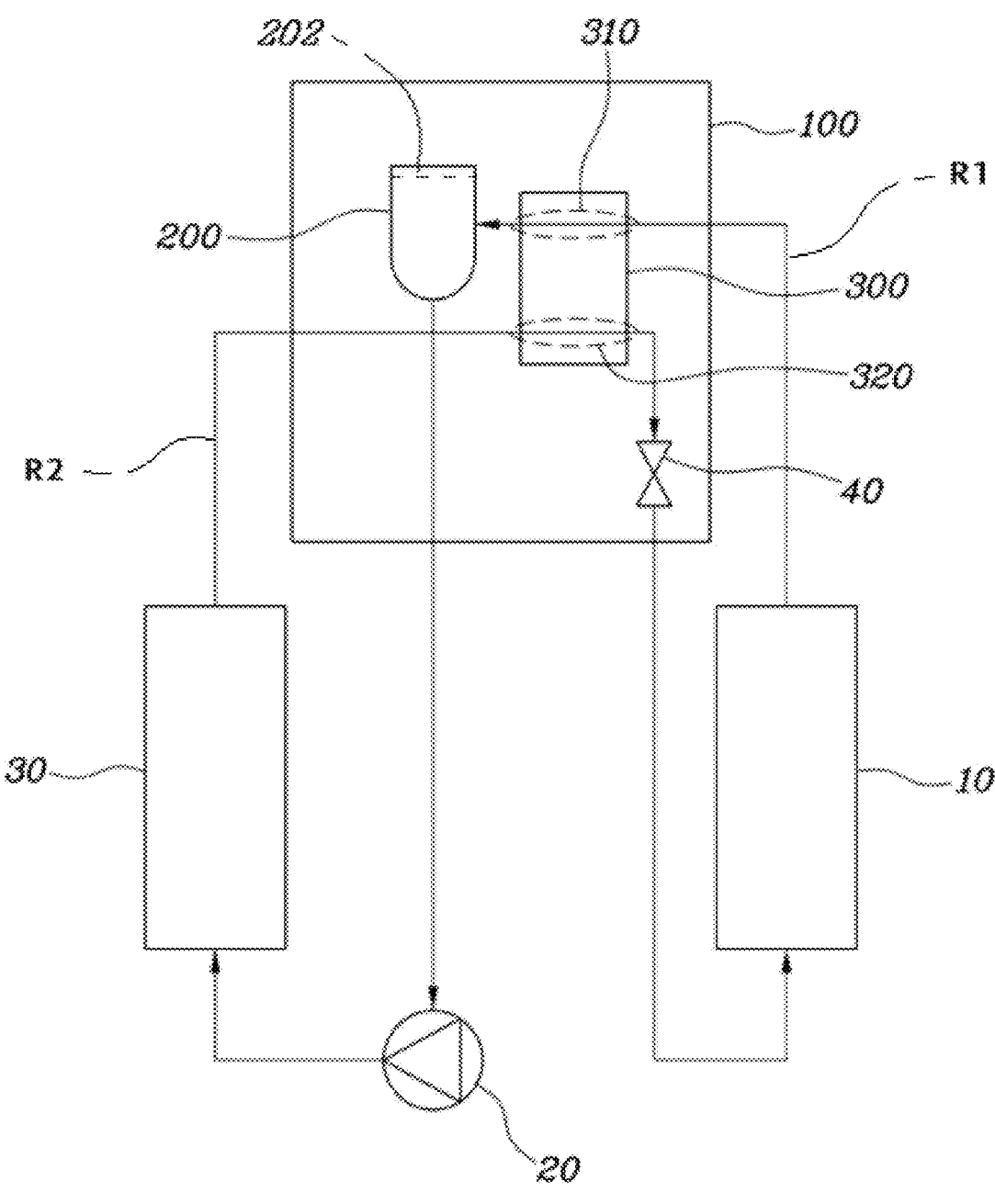
FIG. 1 is a view illustrating a configuration of an integrated thermal management module for a vehicle according to an embodiment of the present invention.

FIG. 1 is a view illustrating a configuration of an integrated thermal management module for a vehicle according to an embodiment of the present invention.

Referring to FIG. 1, the integrated thermal management module for the vehicle has a heat pump system as a basic structure.

In a typical heat pump system, a refrigerant circulates through a circuit that is formed of an 'evaporation-compression-condensation-expansion' structure, thereby transferring heat energy by heat-exchanging. Further, the typical heat pump system utilizes a basic principle in which a temperature of the refrigerant increases when the refrigerant is compressed and a temperature of the refrigerant decreases when the refrigerant expands.

That is, as with an air conditioner, the heat pump includes an evaporator 10, a compressor 20, a condenser 30, an expansion valve 40, and so on as basic components thereof. Further, only a gaseous refrigerant is introduced into the compressor 20 in order to realize the maximum thermal efficiency, and an internal heat exchanger configured to exchange heat of the refrigerant in different states may be provided so as to further improve the thermal efficiency.

Here, in the evaporator 10, the compressor 20, the condenser 30, the expansion valve 40, and so on, each of the components may be manufactured in various forms capable of performing a function of a corresponding component. Particularly, as long as the evaporator 10, the compressor 20, the condenser 30, the expansion valve 40, and so on perform the function of the corresponding component, internal configurations of the evaporator 10, the compressor 20, the condenser 30, the expansion valve 40, and so on are not limited.

Specifically, in the compressor 20, the gaseous refrigerant is compressed, and a high-temperature, high-pressure gaseous refrigerant is generated. The high-temperature, high-pressure gaseous refrigerant is introduced into the condenser 30 and is condensed into a high-pressure liquid refrigerant, and the temperature of the high-pressure liquid refrigerant is relatively reduced (middle-temperature). The middle-temperature, high-pressure liquid refrigerant is decompressed by the expansion valve 40, and becomes a low-temperature, low-pressure refrigerant in which liquid and gaseous states coexist. When the low-temperature, low-pressure refrigerant passes through the evaporator 10, the low-temperature, low-pressure refrigerant absorbs heat and becomes a middle-temperature, low-pressure refrigerant. Further, the refrigerant discharged from the evaporator 10 is introduced into the compressor 20 again, and the same cycle is repeated.

At this time, since the refrigerant discharged from the evaporator 10 still coexists in the liquid and gaseous states, a gas-liquid separator 200 capable of separating a liquid refrigerant and a gaseous refrigerant is required in order to supply only the gaseous refrigerant to the compressor 20.

In embodiments of the present invention, on the basis of the gas-liquid separator 200, components of a vehicle related to a refrigerant are modularized, so that multiple components are compactified and are enabled to be assembled in a package module state during a manufacturing/assembly process, thereby realizing an effect of reducing a production cost.

Meanwhile, the refrigerant (middle-temperature, low-pressure state) discharged from the evaporator 10 corresponds to a relatively low temperature state than the refrigerant (middle-temperature, high-pressure state) discharged from the condenser 30 and positioned before being introduced into the expansion valve 40. Therefore, when heat-exchanging between the refrigerants in two states is performed, the refrigerant discharged from the condenser 30 and positioned before being introduced into the expansion valve 40 may pass through the expansion valve 40 at a lower temperature state than before. As a result, the refrigerant decompressed by the expansion valve 40 is cooled to a lower temperature state than before, and may absorb more heat while passing through the evaporator 10.

That is, the efficiency of the heat pump is further improved, and a component that exchanges heat between the refrigerants in this manner is generally referred to as an internal heat exchanger. However, in embodiments of the present specification, the internal heat exchanger will be described as a refrigerant heat exchanger 300.

Figure 2:
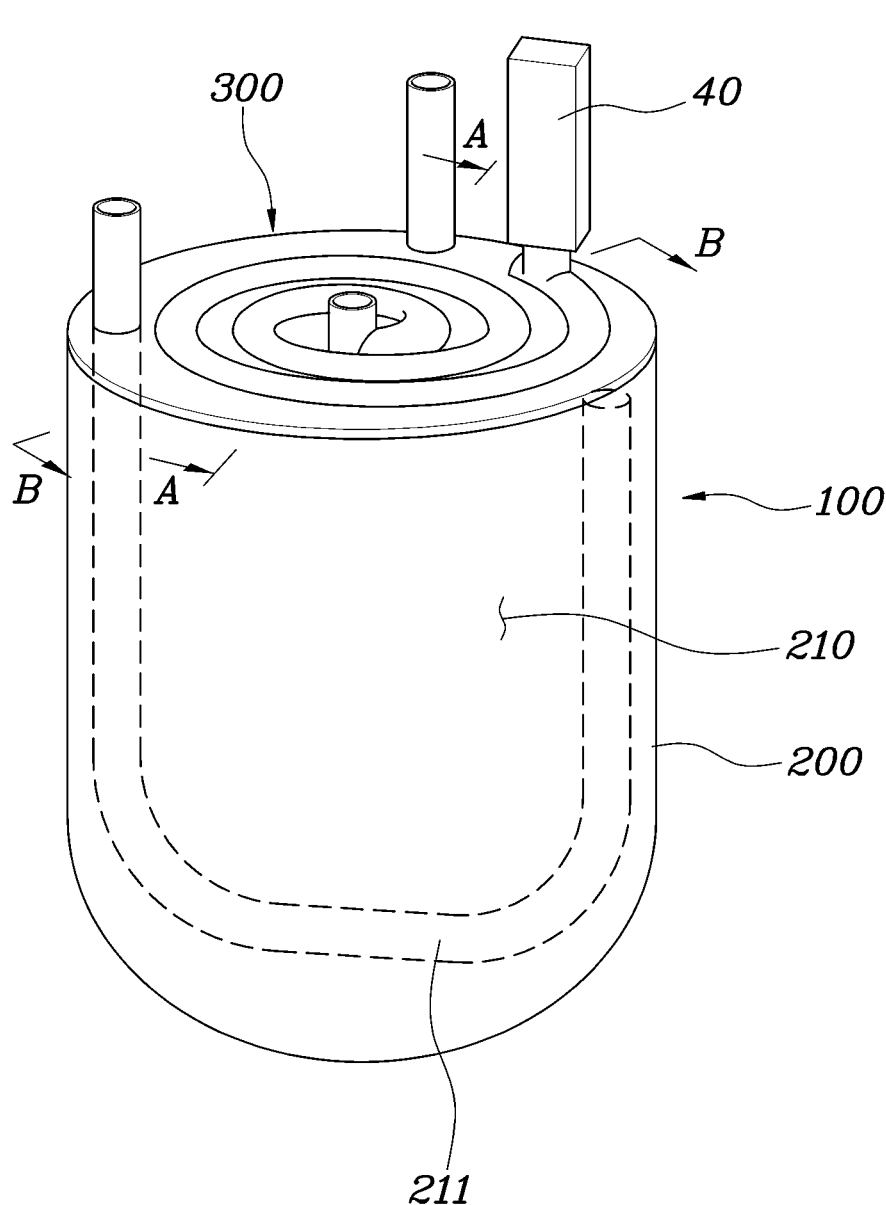
FIG. 2 is a view illustrating the integrated thermal management module for the vehicle according to an embodiment of the present invention.

FIG. 2 is a view illustrating the integrated thermal management module for the vehicle according to an embodiment of the present invention.

Referring to FIG. 2, the integrated thermal management module for the vehicle according to an embodiment of the present invention includes the gas-liquid separator 200 having an internal space 210 in which a first refrigerant is introduced from the evaporator 10, the gas-liquid separator 200 being configured to supply a gaseous refrigerant among the refrigerant in different states in the internal space 210 to the compressor 20, and the refrigerant heat exchanger 300 provided on a refrigerant inlet side of the gas-liquid separator 200, the refrigerant heat exchanger 300 being configured to exchange heat between the first refrigerant discharged from the evaporator 10 and before being introduced into the internal space 210 of the gas-liquid separator 200 and a second refrigerant that flows between the condenser 30 and the expansion valve 40.

The first refrigerant is the refrigerant that is discharged from the evaporator 10, and is the middle-temperature, high-pressure refrigerant in which the liquid and gaseous states coexist. The first refrigerant is introduced into the internal space 210 of the gas-liquid separator 200. Therefore, the gas-liquid separator 200 is provided so as to supply only the gaseous refrigerant in the first refrigerant to the compressor 20.

In an inner portion of the gas-liquid separator 200, a passage 211 formed along an inner surface of the gas-liquid separator 200 is provided, so that only the gaseous refrigerant is allowed to be supplied to the compressor 20. Specifically, a first side of the passage 211 that is formed along the inner surface of the gas-liquid separator 200 has an opening portion that is in communication with the internal space 210 of the gas-liquid separator 200, so that the gaseous refrigerant is allowed to be introduced into the passage 211. Further, a second side of the passage 211 has a discharge portion which protrudes outside the gas-liquid separator 200 and which is connected to the compressor 20, so that the refrigerant passing through the passage 211 is discharged to the compressor 20.

Meanwhile, in the first refrigerant introduced into the internal space 210 of the gas-liquid separator 200, the liquid and gaseous states coexist. Therefore, by gravity, the first refrigerant in the liquid state is separated to a lower side of the internal space 210 of the gas-liquid separator 200, and the first refrigerant in the gas state is separated to an upper side of the internal space 210 of the gas-liquid separator 200.

Therefore, it is preferable that the opening portion for introducing only the gaseous refrigerant is formed at the upper side of the internal space 210 of the gas-liquid separator 200.

In addition, as the gaseous refrigerant is discharged to the compressor 20 through the opening portion, the liquid refrigerant separated to the lower side of the gas-liquid separator 200 naturally evaporates and becomes the gaseous refrigerant. Further, since the gaseous refrigerant that is evaporated moves to the upper side of the gas-liquid separator 200, the gaseous refrigerant is naturally discharged to the compressor 20 through the opening portion.

The second refrigerant is the refrigerant discharged from the condenser 30 and positioned before being introduced into the expansion valve 40, and is the middle-temperature, high-pressure liquid refrigerant. The second refrigerant is in a state in which the temperature of the second refrigerant is higher than the temperature of the first refrigerant. Therefore, the refrigerant heat exchanger 300 is provided so as to exchange heat between the first and second refrigerants.

The refrigerant heat exchanger 300 is positioned on the refrigerant inlet side of the gas-liquid separator 200, and the refrigerant inlet side refers to a top portion of the gas-liquid separator 200. In view of a functional characteristic of the gas-liquid separator 200 that is configured to separate the refrigerant into the liquid refrigerant and the gaseous refrigerant, it is preferable that a portion of the gas-liquid separator 200 into which the refrigerant is introduced is formed on the top portion of the gas-liquid separator 200. Accordingly, it is preferable that the refrigerant heat exchanger 300 provided on the refrigerant inlet side is formed on the top portion of the gas-liquid separator 200.

Meanwhile, when heat-exchanging through the refrigerant heat exchanger 300 is performed, the first refrigerant exchanges heat with the second refrigerant before the first refrigerant is introduced into the internal space 210 of the gas-liquid separator 200. This is to improve the thermal efficiency by increasing the temperature difference between the first refrigerant and the second refrigerant by enabling the heat-exchanging between the first refrigerant and the second refrigerant to be performed in a state in which the temperature of the first refrigerant is as low as possible.

Meanwhile, the refrigerant heat exchanger 300 may be modularized with the gas-liquid separator 200 by being formed integrally with the gas-liquid separator 200 or by being assembled to the gas-liquid separator 200.

As described above, the refrigerant heat exchanger 300 is formed on the top portion of the gas-liquid separator 200 where the refrigerant inlet side of the gas-liquid separator 200 is formed.

At this time, the refrigerant heat exchanger 300 may be formed integrally with the gas-liquid separator 200 by being directly configured as the top portion of the gas-liquid separator 200. Further, the refrigerant heat exchanger 300 may be modularized with the refrigerant heat exchanger 300 by assembling a configuration forming the top portion of the gas-liquid separator 200 (for example, when a separate cover covering the top portion of the gas-liquid separator 200 is provided) to the refrigerant heat exchanger 300.

When the refrigerant heat exchanger 300 is modularized with the gas-liquid separator 200 by being assembled to the gas-liquid separator 200, there is an advantage that the refrigerant heat exchanger 300 may be easily replaced. Further, when the refrigerant heat exchanger 300 is integrally formed with the gas-liquid separator 200, the assembly process is simplified, so that the production cost is reduced.

Meanwhile, in the integrated thermal management module for the vehicle of embodiments of the present invention, the expansion valve 40 provided on the refrigerant heat exchanger 300 and formed to be connected to the refrigerant heat exchanger 300 in a direction in which the second refrigerant is discharged may be further included.

The second refrigerant, which is discharged from the condenser 30 and positioned before being introduced into the expansion valve 40, is introduced into the expansion valve 40 after heat-exchanging with the first refrigerant.

Specifically, the second refrigerant discharged from the condenser 30 exchanges heat with the first refrigerant while passing through the refrigerant heat exchanger 300. Further, the second refrigerant that has completed the heat-exchanging is discharged upward of the gas-liquid separator 200 through the refrigerant heat exchanger 300. That is, in the refrigerant heat exchanger 300, an opening direction is formed upward of the gas-liquid separator 200, so that the second refrigerant discharged from the refrigerant heat exchanger 300 is not discharged to the internal space 210 of the gas-liquid separator 200 but outside the gas-liquid separator 200.

The expansion valve 40 is connected in the direction in which the second refrigerant is discharged. Accordingly, the second refrigerant discharged upward of the gas-liquid separator 200 is introduced into the expansion valve 40 that is formed to be connected in the same direction.

That is, the expansion valve 40 is directly connected in the direction in which the second refrigerant is discharged, so that the expansion valve 40 may form one module together with the refrigerant heat exchanger 300.

On the other hand, the expansion valve 40 may be modularized with the gas-liquid separator 200 by being formed integrally with the gas-liquid separator 200 or by being assembled to the gas-liquid separator 200.

As described above, the refrigerant heat exchanger 300 may be modularized with the gas-liquid separator 200 by being integrally formed with the top portion of the gas-liquid separator where the refrigerant inlet side of the gas-liquid separator 200 is formed or by being assembled to the gas-liquid separator 200. Further, the expansion valve 400 may form one module together with the refrigerant heat exchanger 300 by being directly connected in the direction in which the second refrigerant is discharged.

That is, when the expansion valve 40 forms one module together with the refrigerant heat exchanger 300, the expansion valve 40 may be modularized with the gas-liquid separator 200 by the refrigerant heat exchanger 300 being formed integrally with the top portion of the gas-liquid separator 200 or by the refrigerant heat exchanger 300 being assembled to the gas-liquid separator 200.

When the refrigerant heat exchanger 300 formed as one module together with the expansion valve 40 is modularized with the gas-liquid separator 200 by being assembled to the gas-liquid separator 200, there is an advantage that the refrigerant heat exchanger 300 may be easily replaced. Further, when the refrigerant heat exchanger 300 formed as one module together with the expansion valve 40 is integrally formed with the gas-liquid separator 200, the assembly process is simplified, so that the production cost is reduced.

Meanwhile, the internal space 210 of the gas-liquid separator 200 may be formed in a shape in which an open portion is formed on an upper end portion thereof and a bending point of a hemispherical shape is formed on a lower end portion thereof.

As described above, in the first refrigerant introduced into the internal space 210 of the gas-liquid separator 200, the liquid and gaseous states coexist. Therefore, by gravity, the first refrigerant in the liquid state is separated to the lower side of the internal space 210 of the gas-liquid separator 200, and the first refrigerant in the gas state is separated to the upper side of the internal space 210 of the gas-liquid separator 200.

That is, in order to effectively collect the first refrigerant in the liquid state that is separated to the lower side of the internal space 210 of the gas-liquid separator 200, the bending point of the hemispherical shape is formed on the lower end portion of the internal space 210 of the gas-liquid separator 200.

Specifically, when the first refrigerant in the liquid state is in contact with a surface of the internal space 210 of the gas-liquid separator 200, external force in the downward direction is applied to the first refrigerant in the liquid state by gravity, so that the first refrigerant in the liquid state flows along the bending point shape of the surface of the gas-liquid separator 200. Accordingly, the first refrigerant in the liquid state is collected at the center of the lower end portion of the gas-liquid separator 200. As a result, the first refrigerant in the liquid state may be effectively collected.

Meanwhile, the open portion is formed on the upper end portion of the gas-liquid separator 200, so that the first refrigerant introduced from the evaporator 10 may be accommodated through the open portion, or the first refrigerant in the gas state in the accommodated first refrigerant may be separated and only supplied to the compressor 20. In addition, a flow path into which the refrigerant flows may be disposed on the open portion, so that the condenser 30 and the expansion valve 40 may be in communication with each other via the flow path. That is, the open portion may be understood as a portion where the refrigerant inlet side of the gas-liquid separator 200 is formed.

Meanwhile, the gas-liquid separator 200 may further include a cover 202 covering the open portion of the internal space 210, and the refrigerant heat exchanger 300 may be provided on the cover 202 of the gas-liquid separator 200.

As described above, the open portion is formed on the upper end portion of the gas-liquid separator 200, and the refrigerant heat exchanger 300 may be modularized with the gas-liquid separator 200 by being integrally formed with the refrigerant inlet side of the gas-liquid separator 200 or by being assembled to the gas-liquid separator 200.

That is, by the gas-liquid separator 200 further including the cover 202 covering the open portion of the internal space 210, the refrigerant heat exchanger 300 may be assembled to the cover 202 of the gas-liquid separator 200. Accordingly, the refrigerant heat exchanger 300 may be modularized with the gas-liquid separator 200 by being assembled to the refrigerant inlet side of the gas-liquid separator 200.

At this time, in order to form the refrigerant heat exchanger 300 integrally with the gas-liquid separator 200, the separate cover 202 is not provided on the gas-liquid separator 200, and the refrigerant heat exchanger 300 may be utilized as the cover 202 of the gas-liquid separator 200.

Therefore, when the refrigerant heat exchanger 300 is modularized with the gas-liquid separator 200 by being assembled to the cover 202 of the gas-liquid separator 200, there is an advantage that the refrigerant heat exchanger 300 may be replaced by only separating the cover 202 of the gas-liquid separator 200 when the refrigerant heat exchanger 300 is replaced. Further, when the refrigerant heat exchanger 300 is utilized as the cover 202 and is integrally formed with the gas-liquid separator 200, the refrigerant heat exchanger 300 may be easily replaced, and also the assembly process is simplified and the production cost is reduced.

Figure 3:
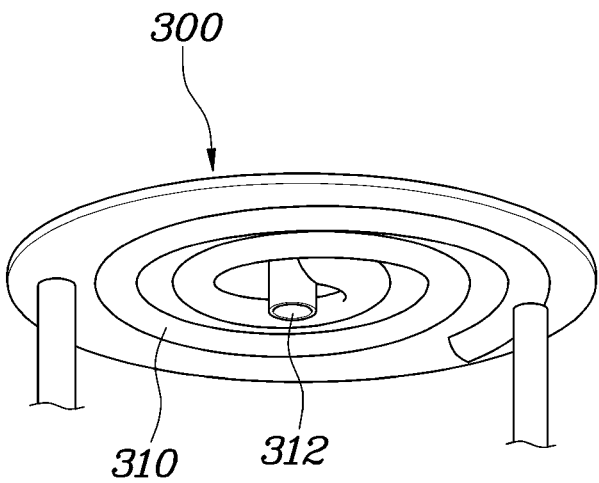
FIG. 3 is a view illustrating a refrigerant heat exchanger of the integrated thermal management module for the vehicle according to an embodiment of the present invention.

For reference, the refrigerant heat exchanger 300 formed integrally with the gas-liquid separator 200 or assembled to the gas-liquid separator 200 may be formed in a shape as illustrated in FIG. 3. This will be described later while specifically examining characteristics and working principles according to the shape of the refrigerant heat exchanger 300.

Figure 5:
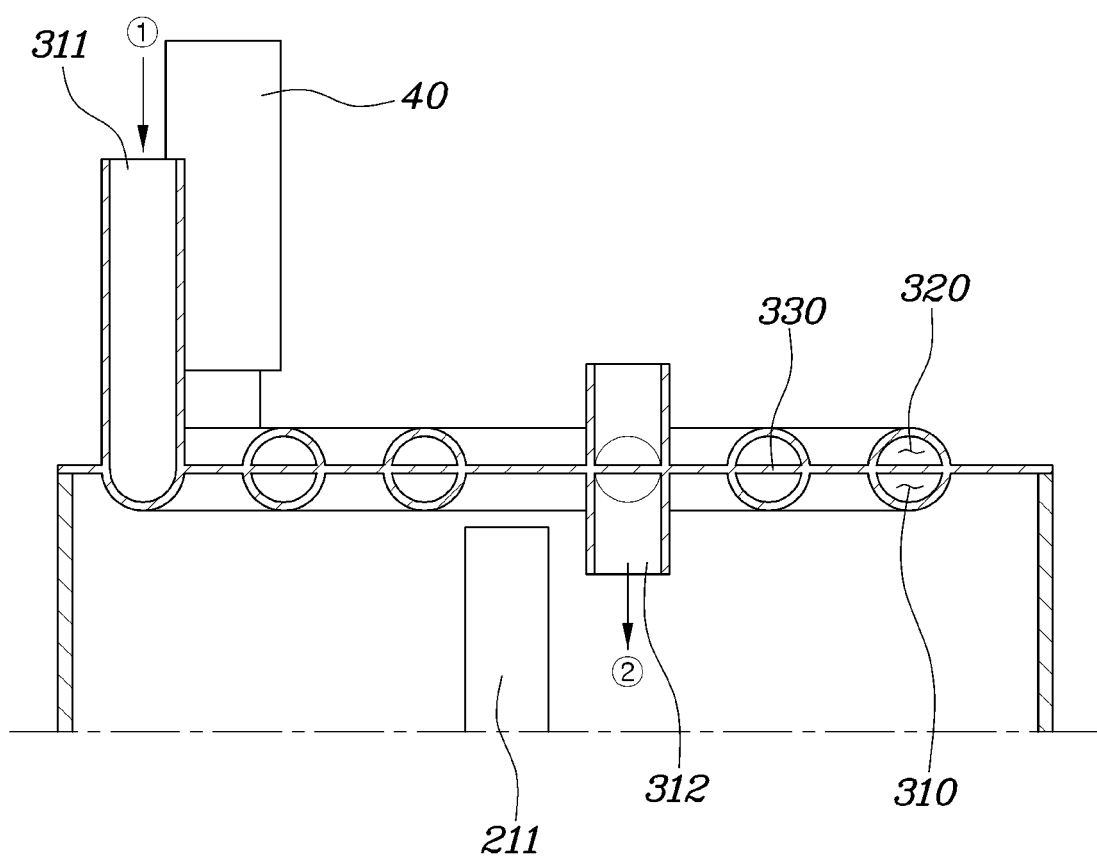
FIG. 5 is a cross-sectional view taken along the line A-A in FIG. 2.

FIG. 5 is a cross-sectional view taken along line A-A in FIG. 2.

Referring to FIG. 5, the refrigerant heat exchanger 300 may include a first channel 310 through which the first refrigerant is discharged to the internal space 210 of the gas-liquid separator 200, a second channel 320 through which the second refrigerant is discharged to the expansion valve, and a partition wall 330 formed between the first channel 310 and the second channel 320 and separating both channels from each other.

That is, the first refrigerant discharged from the evaporator 10 is discharged to the internal space 210 of the gas-liquid separator 200 through the first channel 310, the second refrigerant discharged from the condenser 30 is introduced into the expansion valve 40 by passing through the second channel 320, and the partition wall 330 is formed between the first channel 310 and the second channel 320 such that the both channels are separated from each other.

Specifically, the first channel 310 and the second channel 320 are formed in close contact with each other by placing the partition wall 330 between them, and the refrigerants flowing inside the first channel 310 and the second channel 320 exchange heat with each other via the partition wall 330.

Therefore, the partition wall 330 has a material having a high thermal transfer efficiency, and is formed of a material having a strong corrosion resistance or strong durability against the refrigerant. Further, the partition wall 330 is preferably formed to have a thickness that separates the first channel 310 and the second channel 320, but is appropriately provided so as not to affect the thermal transfer efficiency.

As a result, by the partition wall 330 as described above, the first refrigerant passes through the first channel 310 before being discharged to the internal space 210 of the gas-liquid separator 200, and the first refrigerant naturally exchanges heat with the second refrigerant that flows through the second channel 320.

Meanwhile, cross-sectional areas of the channels 310 and 320 are formed in a circular shape, and the first channel 310 and the second channel 320 are separated from each other by the partition wall 330 that is formed across the center of the circle.

Referring to FIG. 5, the cross-sectional area of each of the first channel 310 and the second channel 320 is formed in a semicircular shape, and semicircles are symmetrically arranged so that diameters of the semicircles are in contact with each other, so that one circle shape is formed. Further, the partition wall 330 is formed across the center of the circle and forms a diameter of the circle, and the first channel 310 and the second channel 320 are separated from each other by the partition wall 330.

The cross-sectional areas of the first channel 310 and the second channel 320 may be formed in various shapes such as squares, pentagons, and the like. However, when the cross-sectional areas of the first channel 310 and the second channel 320 are formed in the circular shape, the pressure loss generated during the flow of the fluid may be minimized.

In addition, in the liquid state, the liquid does not flow in partial sections in the flow path due to the cohesive force thereof and is adsorbed to an inner surface of the flow path. However, since the cross-sectional areas of the first channel 310 and the second channel 320 are formed in the circular shape having a smooth surface, friction loss due to the adsorption of the refrigerant may be minimized.

For reference, as illustrated in FIG. 5, the partition wall 330 may be formed parallel to a surface of the upper end portion of the gas-liquid separator 200. However, the partition wall 330 may be formed in a direction from upward to downward so as to be perpendicular to the surface of the upper end portion of the gas-liquid separator 200.

Meanwhile, a lower side of the circle separated by the partition wall 330 may protrude to the internal space 210 of the gas-liquid separator 200, and an upper side of the circle may protrude outside the gas-liquid separator 200.

In this situation, as illustrated in FIG. 5, it is preferable that the partition wall 330 is formed parallel to the surface of the upper end portion of the gas-liquid separator 200.

When the partition wall 330 is formed as described above, it can be understood that the first refrigerant passes through the first channel 310 that forms the lower side of the circle separated by the partition wall 330, and it can be understood that the second refrigerant passes through the second channel 320 that forms the upper side of the circle separated by the partition wall 330.

The first refrigerant is required to be discharged to the internal space 210 of the gas-liquid separator 200 after the first refrigerant passes through the first channel 310 of the refrigerant heat exchanger 300. Further, after the second refrigerant passes through the second channel 320 of the refrigerant heat exchanger 300, the second refrigerant is not introduced into the gas-liquid separator 200 and is discharged to the expansion valve 40 since the second channel 320 is connected to the expansion valve 40.

Therefore, since the first channel 310 forms the lower side of the circle through which the first refrigerant passes, the first refrigerant passing through the first channel 310 may be stably discharged to the internal space 210 of the gas-liquid separator 200.

Similarly, since the second channel 320 through which the second refrigerant passes forms the upper side of the circle, the second refrigerant passing through the second channel 320 may be stably discharged to the expansion valve 40.

For this reason, the lower side of the circle separated by the partition wall 330 protrudes to the internal space 210 of the gas-liquid separator 200, and the upper side of the circle protrudes outside the gas-liquid separator 200.

FIG. 3 is a view illustrating the refrigerant heat exchanger 300 of the integrated thermal management module for the vehicle according to an embodiment of the present invention. For reference, FIG. 3 illustrates the refrigerant heat exchanger 300 when viewed from the bottom.

Referring to FIG. 3, the first channel 310 and the second channel 320, which are provided on the refrigerant heat exchanger 300 of the integrated thermal management module for the vehicle according to embodiments of the present invention, may be formed in a spiral shape.

Since the refrigerant heat exchanger 300, which includes the first channel 310 and the second channel 320, is provided on the upper end portion of the gas-liquid separator 200 on which the refrigerant inlet side of the gas-liquid separator 200 is formed, there is a limitation depending on the size of the cross-sectional area of the upper end portion of the gas-liquid separator 200.

That is, the first channel 310 and the second channel 320 are required to have a flow path that can maximize the heat-exchanging process in a predetermined area. To this end, the first channel 310 and the second channel 320 may have the flow path formed in a zigzag shape, or may have the flow path formed in a circular shape or a spiral shape.

However, if the flow path is formed in the zigzag shape, when the refrigerant is in the liquid state, there may be a problem that the refrigerant does not flow properly since the refrigerant does not flow in a bent section in the flow path of the zigzag shape and is adsorbed to an inner surface of corresponding section due to the cohesive force of the liquid.

In addition, since the bent section in the flow path formed in the zigzag shape severely twists the direction or the angle in which the fluid flows, there is a problem that the pressure loss generated during the flow of the fluid becomes very large.

Therefore, it is preferable that each of the first channel 310 and the second channel 320 is formed in a smooth circular shape or a spiral shape so that the friction loss and the pressure loss are minimized. In addition, in order to utilize the predetermined area to the maximum, the spiral shape capable of repeatedly forming different circular shapes is more preferable than a single circular shape.

For this reason, the first channel 310 and the second channel 320, which are provided on the refrigerant heat exchanger 300 of the integrated thermal management module for the vehicle according to embodiments of the present invention, are formed in the spiral shape.

Meanwhile, the first refrigerant and the second refrigerant may flow along the spiral shape of the corresponding channels 310 and 320, and may flow in opposite directions.

The first channel 310 and the second channel 320 are both configured such that the first channel 310 and the second channel 320 are in communication with the outside of the gas-liquid separator 200. Specifically, except for a first side of the first channel 310 in communication with the internal space 210 of the gas-liquid separator 200, a second side of the first channel 310 and opposite end portions of the second channel 320 are configured such that the second side of the first channel 310 and the opposite end portions of the second channel 320 are in communication with the outside of the gas-liquid separator 200.

That is, a portion through which the first refrigerant is introduced into the first channel 310 and a portion through which the second refrigerant is introduced into the second channel 320 are in communication with the outside of the gas-liquid separator 200, so that the portion through which the first refrigerant is introduced into the first channel 310 and the portion through which the second refrigerant is introduced into the second channel 320 cannot be disposed in exactly the same position. Accordingly, there is a structural problem in which the portions have to be disposed to be spaced apart in a degree.

Therefore, it is necessary to dispose the portion through which the first refrigerant is introduced into the first channel 310 and the portion through which the second refrigerant is introduced into the second channel 320 to be spaced apart from the beginning, but to allow the first channel 310 and the second channel 320 to perform the maximum heat-exchange in a limited predetermined area.

Accordingly, when the first refrigerant and the second refrigerant flow in the same direction, the portion through which the first refrigerant is introduced into the first channel 310 and the portion through which the second refrigerant is introduced into the second channel 320 are necessarily spaced apart from each other. As a result, in a region where the portions are spaced apart from each other, the first channel 310 and the second channel 320 cannot be in contact with each other, so that a region where the first refrigerant and the second refrigerant cannot perform the heat-exchange is formed.

On the other hand, when the first refrigerant and the second refrigerant flow in opposite directions, and when the portion through which the first refrigerant is introduced into the first channel 310 is disposed on a border portion of the spiral shape and the portion through which the second refrigerant is introduced into the second channel 320 is disposed on the center of the spiral shape, the portions where the respective refrigerants are discharged are separated and discharged to the inside and the outside of the gas-liquid separator 200, so that the region where the first refrigerant and the second refrigerant cannot perform the heat-exchange may be minimized.

Accordingly, the structural problem may be solved, and the limited area may be utilized to the maximum.

Meanwhile, a first inlet portion 311 of the first channel 310 may be disposed on the border portion of the spiral shape, a first discharge portion 312 of the first channel 310 may be disposed to the center of the spiral shape, a second inlet portion 321 of the second channel 320 may be disposed on the center of the spiral shape, and a second discharge portion 322 of the second channel 320 may be disposed on the border portion of the spiral shape.

The first refrigerant is introduced into the first inlet portion 311 of the first channel 310, and is discharged to the first discharge portion 312 of the first channel 310. Further, the second refrigerant is introduced into the second inlet portion 321 of the second channel 320, and is discharged to the second discharge portion 322 of the second channel 320.

That is, the first refrigerant flows from the border portion of the spiral shape to the center of the spiral shape, and the second refrigerant flows from the center of the spiral shape to the border portion of the spiral shape.

Accordingly, the first refrigerant and the second refrigerant flow along the spiral shape of the corresponding channels 310 and 320, and the first refrigerant and the second refrigerant flow in opposite directions. Further, a structure of the refrigerant inlet side of the gas-liquid separator 200 may be stabilized, and a durability of the channels 310 and 320 may be improved.

When the first and second inlet portions 311 and 321 and the first and second discharge portions of the first and second channels 310 and 320 are disposed adjacent to the same position in the spiral shape, at the moment when the first refrigerant and the second refrigerant are introduced through the first and second inlet portions 311 and 321 of each of the channels 310 and 320, a pressure due to the first refrigerant and the second refrigerant is overlapped and applied to a portion where the inlet portions are disposed.

As a result, there is a problem that the durability of the channels 310 and 320 is reduced, and there are additional problems such as the first and second inlet portions 311 and 321 are required to have the strongest rigidity among the overall shapes of the channels 310 and 320 in order to secure the durability of the channels 310 and 320.

In addition, when the first discharge portion 312 of the first channel 310 is formed on the center of the spiral shape, the first refrigerant passing through the first channel 310 and discharged to the internal space 210 of the gas-liquid separator 200 is discharged to the center portion of the gas-liquid separator 200 at the beginning, so that a situation in which the refrigerant in the liquid state in the first refrigerant is adsorbed to the inner surface of the gas-liquid separator 200 may be minimized.

Figure 4:
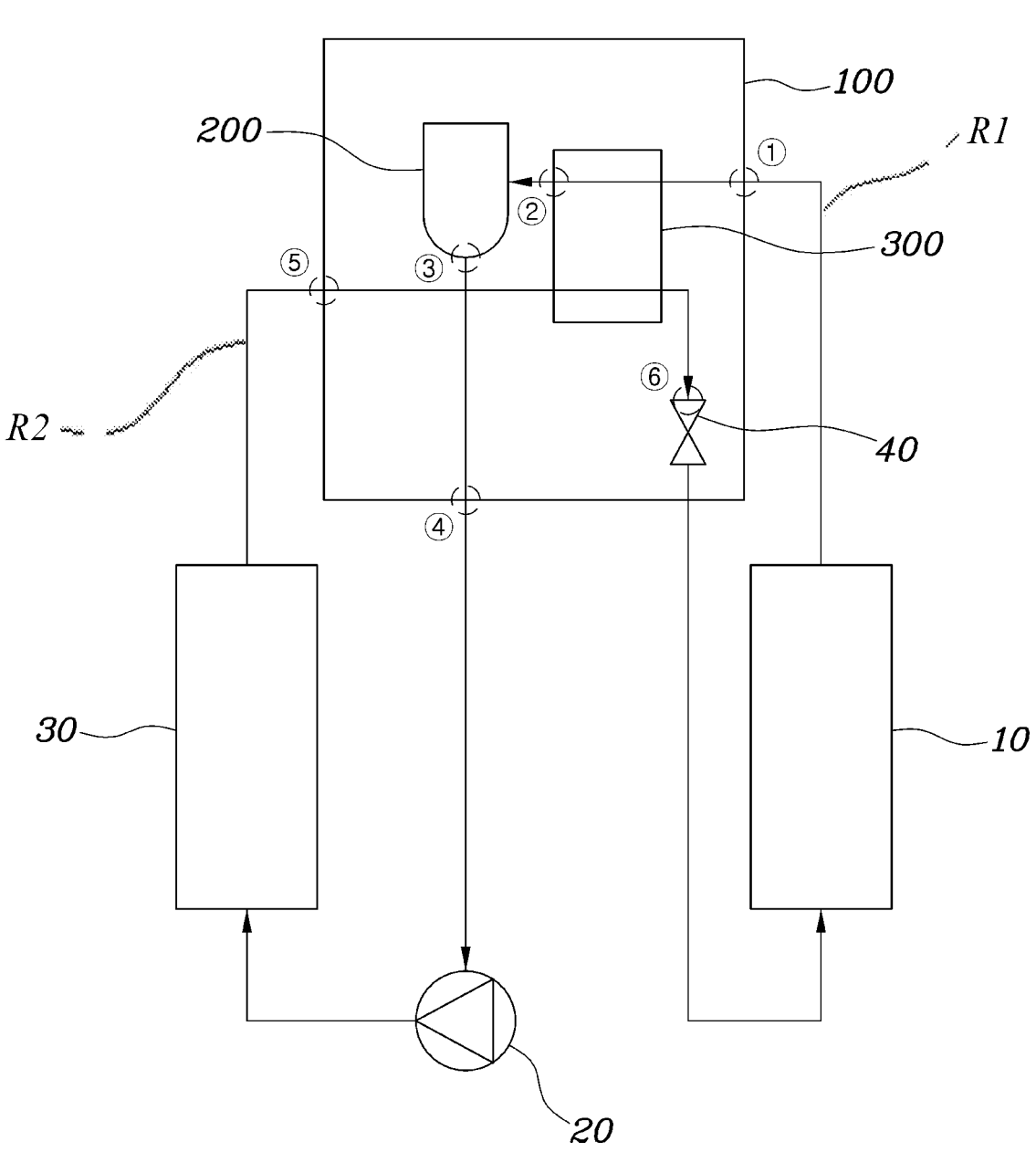
FIG. 4 is a view illustrating an order in which a refrigerant flows inside a structure of the integrated thermal management module for the vehicle according to an embodiment of the present invention.
Figure 6:
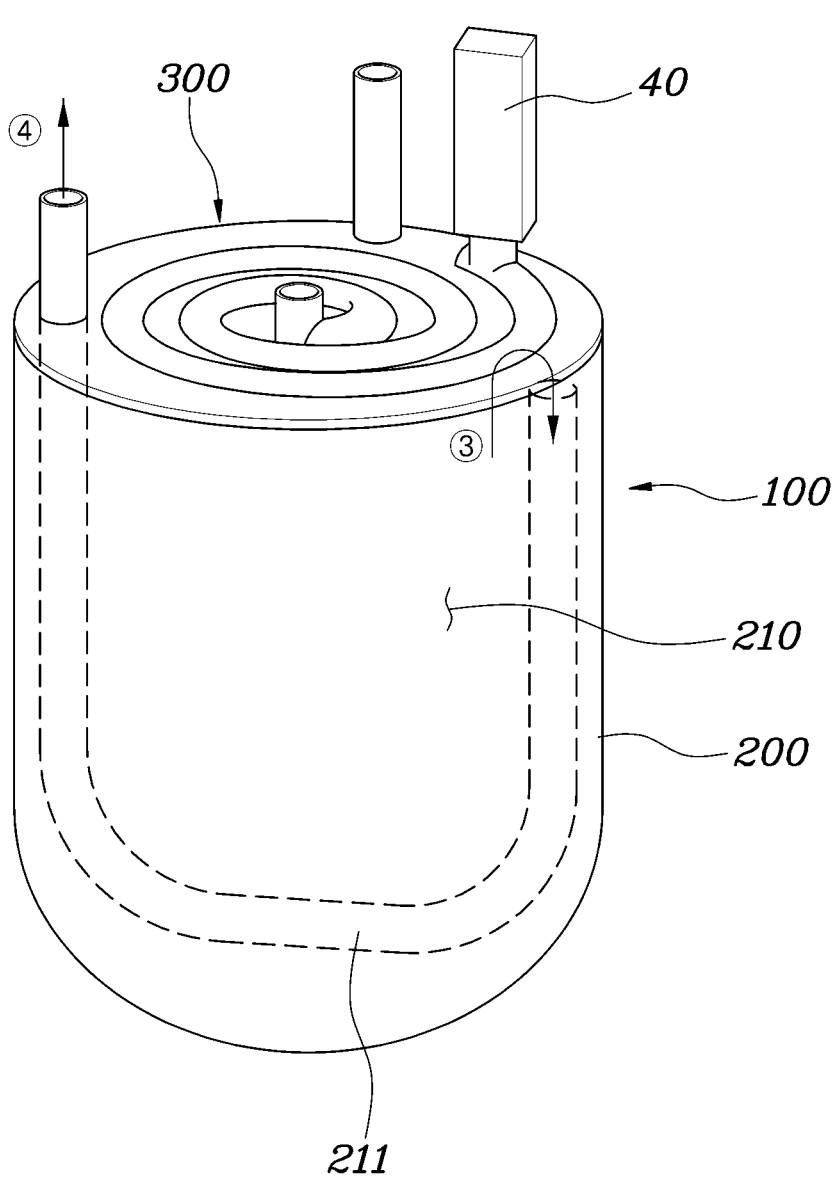
FIG. 6 is a view illustrating a process in which a gaseous refrigerant flows from an internal space of a gas-liquid separator in the integrated thermal management module for the vehicle according to an embodiment of the present invention.
Figure 7:
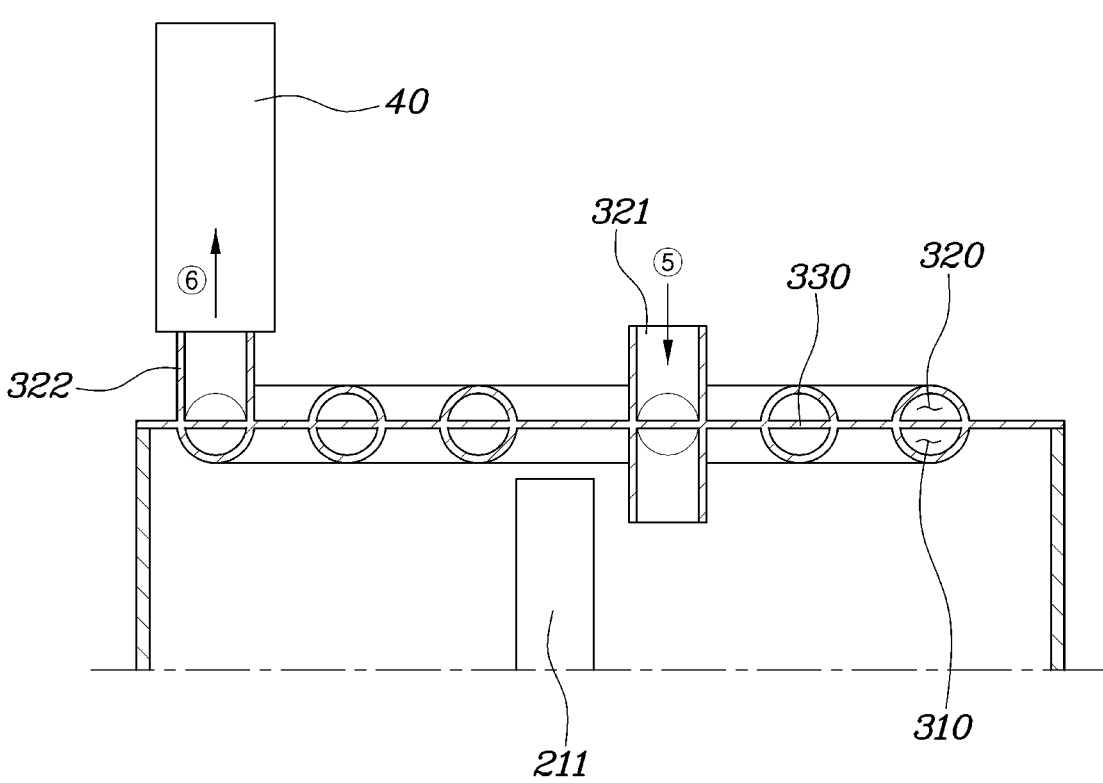
FIG. 7 is a cross-sectional view taken along the line B-B in FIG. 2.

FIG. 4 is a view illustrating an order in which the refrigerant flows inside the structure of the integrated thermal management module for the vehicle according to an embodiment of the present invention. FIG. 5 is a cross-sectional view along line A-A in FIG. 2. FIG. 6 is a view illustrating a process in which the gaseous refrigerant flows from the internal space of the gas-liquid separator in the integrated thermal management module for the vehicle according to an embodiment of the present invention. FIG. 7 is a cross-sectional view along line B-B in FIG. 2.

Hereinafter, referring to FIGS. 4 to 7, a process in which the refrigerant flows inside the integrated thermal management module for the vehicle according to embodiments of the present invention will be additionally described.

In FIG. 4, ① illustrates that the first refrigerant discharged from the evaporator 10 is introduced into the first channel 310, ② illustrates that the first refrigerant passes through the first channel 310 and is discharged to the internal space 210 of the gas-liquid separator 200, ③ illustrates that the gaseous refrigerant separated from the internal space 210 of the gas-liquid separator 200 is introduced into the opening portion which is provided inside the gas-liquid separator 200 and which is provided on the first side of the passage 211 formed along the inner surface of the gas-liquid separator 200, ④ illustrates that the refrigerant passing through the passage 211 formed along the inner surface of the gas-liquid separator 200 is discharged outside and moves toward the compressor 20, ⑤ illustrates that the second refrigerant passing through the compressor 20 and the condenser 30 is introduced into the second channel 320, and ⑥ illustrates that the second refrigerant passes through the second channel 320 and is discharged to the expansion valve 40.

FIG. 5 corresponds to ① and ② in FIG. 4, FIG. 6 corresponds to ③ and ④ in FIG. 4, and FIG. 7 corresponds to ⑤ and ⑥ in FIG. 4.

Referring to FIG. 5, the first refrigerant is introduced inside the refrigerant heat exchanger 300 through the first inlet portion 311 of the first channel 310, and is discharged to the internal space 210 of the gas-liquid separator 200 through the first discharge portion 312 of the first channel 310 after the first refrigerant exchanges heat with the second refrigerant while flowing along the refrigerant heat exchanger 300.

Referring to FIG. 6, the liquid refrigerant in the refrigerant discharged to the internal space 210 of the gas-liquid separator 200 is collected to the lower portion of the internal space 210 of the gas-liquid separator 200, and the gaseous refrigerant is separated to the upper portion. Further, the gaseous refrigerant is introduced into the opening portion of the passage 211 formed along the inner surface of the gas-liquid separator 200, and is moved to the compressor 20 by being discharged outside the gas-liquid separator 200.

Referring to FIG. 7, the second refrigerant passing through the compressor 20 and the condenser 30 is introduced inside the refrigerant heat exchanger 300 through the second inlet portion 321 of the second channel 320, exchanges heat with the first refrigerant while flowing along the refrigerant heat exchanger 300, and is discharged to the expansion valve 40 through the second discharge portion 322 of the second channel 320.

Although exemplary embodiments of the present invention have been described herein, it is understood that the present invention should not be limited to these exemplary embodiments and that various changes and modifications can be made by one of ordinary skill in the art within the spirit and scope of the present invention.

What is claimed is:

1. An integrated thermal management module for a vehicle, the integrated thermal management module comprising:
    a gas-liquid separator having an internal space configured to accommodate a refrigerant discharged from an evaporator, the gas-liquid separator being configured to supply to a compressor a portion of the refrigerant discharged from the evaporator that is in a gas state in the internal space; and
    a refrigerant heat exchanger provided on a refrigerant inlet side of the gas-liquid separator, the refrigerant heat exchanger being configured to exchange heat of the refrigerant discharged from the evaporator with heat of the refrigerant having a flow path between a condenser and an expansion valve before the refrigerant discharged from the evaporator is introduced into the internal space of the gas-liquid separator, the refrigerant heat exchanger comprising:
    a first channel through which the refrigerant discharged from the evaporator is discharged to the internal space of the gas-liquid separator;
    a second channel through which the refrigerant having a flow path between the condenser and the expansion valve is discharged to the expansion valve; and
    a partition wall provided between the first channel and the second channel to separate the first channel and the second channel from each other;
    wherein a cross-sectional area of each of the first channel and the second channel has a circular shape; and
    wherein the partition wall is configured to cross a center of a circle of the circular shape.

2. The integrated thermal management module of claim 1, wherein a first side of the circle protrudes to the internal space of the gas-liquid separator and a second side of the circle separated by the partition wall protrudes outside the gas-liquid separator.

3. The integrated thermal management module of claim 1, wherein each of the first channel and the second channel has a spiral shape.

4. The integrated thermal management module of claim 3, wherein a flow path of the refrigerant discharged from the evaporator and the flow path of the refrigerant having a flow path between the condenser and the expansion valve are along the spiral shape of the first channel and the second channel, respectively, and are in opposite directions.

5. The integrated thermal management module of claim 3, wherein a first inlet portion of the first channel is disposed on a border portion of the spiral shape of the first channel, a first discharge portion of the first channel is disposed on a center portion of the spiral shape of the first channel, a second inlet portion of the second channel is disposed on a center portion of the spiral shape of the second channel, and a second discharge portion of the second channel is disposed on a border portion of the spiral shape of the second channel.

6. The integrated thermal management module of claim 1, wherein the refrigerant heat exchanger is formed integrally with the gas-liquid separator or is assembled to the gas-liquid separator.

7. The integrated thermal management module of claim 1, wherein the expansion valve is provided on the refrigerant heat exchanger and is connected to the refrigerant heat exchanger in a direction in which the refrigerant having a flow path between the condenser and the expansion valve is discharged.

8. A method of operating an integrated thermal management module for a vehicle, the method comprising:

exchanging, using a refrigerant heat exchanger, heat of a refrigerant discharged from an evaporator with heat of the refrigerant having a flow path between a condenser and an expansion valve;

introducing the refrigerant discharged from the evaporator to an internal space of a gas-liquid separator after the exchanging of the heat of the refrigerant discharged from the evaporator with the heat of the refrigerant having a flow path between the condenser and the expansion valve; and supplying a portion of the refrigerant discharged from the evaporator that is in a gas state from the internal space to a compressor, wherein the refrigerant heat exchanger comprises:

a first channel through which the refrigerant discharged from the evaporator is discharged to the internal space of the gas-liquid separator;

a second channel through which the refrigerant having a flow path between the condenser and the expansion valve is discharged to the expansion valve; and a partition wall provided between the first channel and the second channel to separate the first channel and the second channel from each other;

wherein a cross-sectional area of each of the first channel and the second channel has a circular shape; and wherein the partition wall is configured to cross a center of a circle of the circular shape.

9. The method of claim 8, wherein the heat of the refrigerant discharged from the evaporator is exchanged at the refrigerant heat exchanger provided on a refrigerant inlet side of the gas-liquid separator.

10. The method of claim 9, wherein the refrigerant heat exchanger is formed integrally with the gas-liquid separator or is assembled to the gas-liquid separator.

11. The method of claim 8, wherein the expansion valve is provided on the refrigerant heat exchanger and is connected to the refrigerant heat exchanger in a direction in which the refrigerant having a flow path between the condenser and the expansion valve is discharged.

12. The method of claim 11, wherein the expansion valve is formed integrally with the gas-liquid separator or is assembled to the gas-liquid separator.

13. The method of claim 8, wherein the internal space of the gas-liquid separator has a shape in which an open portion is formed at a first end portion of the gas-liquid separator and a hemispherical portion is formed at a second end portion of the gas-liquid separator.

14. The method of claim 8, wherein the expansion valve is formed integrally with the gas-liquid separator or is assembled to the gas-liquid separator.

15. The method of claim 8, wherein each of the first channel and the second channel of the refrigerant heat exchanger has a spiral shape, and wherein the refrigerant discharged from the evaporator and the refrigerant having a flow path between the condenser and the expansion valve flow along the spiral shape of the respective channels in opposite directions.

16. An integrated thermal management module for a vehicle, the integrated thermal management module comprising:

a gas-liquid separator having an internal space configured to accommodate a refrigerant discharged from an evaporator, the gas-liquid separator being configured to supply to a compressor a portion of the refrigerant discharged from the evaporator that is in a gas state in the internal space; and a refrigerant heat exchanger provided on a refrigerant inlet side of the gas-liquid separator, the refrigerant heat exchanger being configured to exchange heat of the refrigerant discharged from the evaporator with heat of the refrigerant having a flow path between a condenser and an expansion valve before the refrigerant discharged from the evaporator is introduced into the internal space of the gas-liquid separator, the refrigerant heat exchanger comprising:

a first channel through which the refrigerant discharged from the evaporator is discharged to the internal space of the gas-liquid separator;

a second channel through which the refrigerant having a flow path between the condenser and the expansion valve is discharged to the expansion valve; and a partition wall provided between the first channel and the second channel to separate the first channel and the second channel from each other, wherein each of the first channel and the second channel has a spiral shape, and wherein a first inlet portion of the first channel is disposed on a border portion of the spiral shape of the first channel, a first discharge portion of the first channel is disposed on a center portion of the spiral shape of the first channel, a second inlet portion of the second channel is disposed on a center portion of the spiral shape of the second channel, and a second discharge portion of the second channel is disposed on a border portion of the spiral shape of the second channel.

17. The integrated thermal management module of claim 16, wherein the refrigerant discharged from the evaporator and the refrigerant having a flow path between the condenser and the expansion valve flow along the spiral shape of the first channel and the second channel, respectively, and flow in opposite directions.

18. The integrated thermal management module of claim 16, wherein the refrigerant heat exchanger is formed integrally with the gas-liquid separator or is assembled to the gas-liquid separator.

19. The integrated thermal management module of claim 16, wherein the internal space of the gas-liquid separator has a shape in which an open portion is formed at a first end portion of the gas-liquid separator and a hemispherical portion is formed at a second end portion of the gas-liquid separator.

20. The integrated thermal management module of claim 16, wherein the partition wall has a material with a high thermal transfer efficiency and a strong corrosion resistance or strong durability against the refrigerant.

\* \* \* \* \*